United States Patent [19]

Eibner

[11] 4,323,932
[45] Apr. 6, 1982

[54] READBACK PULSE COMPENSATOR

[75] Inventor: Jules A. Eibner, Maple Glen, Pa.

[73] Assignee: Sperry Corporation, New York, N.Y.

[21] Appl. No.: 62,279

[22] Filed: Jul. 30, 1979

[51] Int. Cl.³ .............................................. G11B 5/09
[52] U.S. Cl. ...................................................... 360/45
[58] Field of Search .......................................... 360/45

[56] References Cited

U.S. PATENT DOCUMENTS 3,775,759  11/1973  Armitage et al. ...................... 360/45
3,996,614  12/1976  Budejicky .
4,081,756  3/1978  Price et al. .

Primary Examiner—Vincent P. Canney

Attorney, Agent, or Firm—Thomas J. Scott; William E. Cleaver; Marshall M. Truex

[57] ABSTRACT

A system for compensating misalignment between information represented by transitions in a data bearing medium and a played back signal, the played back signal having consecutive opposite-polarity peaks corresponding to said data transitions, which system comprises a low-pass filter, which receives a signal from a non-linear element, preferably a pulse forming circuit, into which has been introduced the misaligned played back signal, and circuitry for converting the filtered signal to a series of pulses representative of the data transitions, which pulses have reduced misalignment with respect to the data transitions.

18 Claims, 4 Drawing Figures

READBACK PULSE COMPENSATOR

BACKGROUND OF THE INVENTION

This invention relates to techniques for compensating certain distortions which are experienced during the processing of information-bearing electrical signals. More particularly, the invention relates to the compensation of distortions which are experienced during the playback of information stored in binary form on magnetic recording media.

During such playback there is conventionally produced a signal whose waveform can be thought of as being the result of the superposition of two separate signals, one of which experiences a peak of one polarity (e.g. positive) when the magnetization of the recording medium reverses in one direction, and another which experiences a peak of the opposite polarity (i.e. negative) when the magnetization reverses in the opposite direction.

The informational coding of these recordings is typically such that the resulting positive and negative going signal peaks are not uniformly spaced (i.e. 180° out of phase). For example, a magnetization reversal in one direction, leading to a negative signal component peak, may be followed by an opposite reversal, leading to a positive signal peak after 200 ns. However, the next following magnetization may not occur for 400 ns. Consequently, the next following negative signal peak would not occur until 400 ns after the positive signal peak, and so forth. It can readily be shown that this results in a displacement, or "pulling" of the peaks of the composite electrical signal away from the peak positions of the separate components. Since it is the timing of these peaks in the composite electrical signal which determines the ultimate decoding and recovery of the recorded information, this pulling interferes with faithful reproduction.

This problem becomes increasingly serious as the information stored on the magnetic medium is more and more densely packed because the successive signal peaks then follow each other more and more rapidly. As a result, the amount of pulling of these peaks away from their precise reversal-representing positions increases thereby causing an increasingly adverse effect on the faithfulness of signal reproduction. Indeed, when sophisticated coding is used to achieve dense information packing, even a small amount of such pulling (sometimes referred to as intersymbol interference) can create serious distortions in reproduction, including loss of whole data bits, or groups of bits, or even loss of synchronization, all of which is particularly serious when computer-type operations are to be performed by means of the recovered information.

The problems noted above are by no means new, but have been well recognized in the art, and various solutions have been proposed. Some of these proposed solutions operate upon the information as it is being recorded, and seek to predistort it in a manner which would yield an undistorted, recovered signal despite the intersymbol interference encountered during reproduction. Others of these proposed solutions (sometimes referred to as playback equalization) operate on the signal derived during reproduction.

Representative prior discussions of signal recovery, and of the problems and proposed solutions for the type of distortions under consideration are found, for example, in the following:

Increased Magnetic Recording Read-Back Resolution by Means of a Linear Passive Network
by H. M. Sierra
IBM Journal, January 1963
Signal Equalization in Digital Magnetic Recording
by George V. Jacoby
IEEE Transactions on Magnetics, September 1968
U.S. Pat. No. 2,657,276, issued Oct. 27, 1953

Such prior proposals for dealing with these problems, while successful to some degree, also left something to be desired.

Some were inordinately demanding in terms of equipment complexity. Others, restricted the freedom of choice of the reproducing equipment. Still others, due to the fact that they operated at an analog point in the signal processing, were unduly sensitive to noise, and so forth.

For example, one way in which such intersymbol interference can be reduced is to utilize high speed logic, which logic is faster than the data that is to be handled by that logic. However, this requires the data rate, and the memory technology, to lag behind that state of the art of the logic used. Such a solution is unacceptable.

Another solution which has been suggested is to narrow the pulses which are used in conjunction with the data recording system, to reduce intersymbol interference between closely adjacent data pulses. In order to accomplish this, the data is processed through a high-pass filter, thereby narrowing the resulting data pulses. Such circuits have proved to either be too complex to realistically realize, or to produce a ringing effect which can actually contribute to the intersymbol interference between adjacent data pulses.

None of the systems proposed to date have produced a realizable data processing system which is capable of removing such intersymbol interference from a series of high speed data pulses.

Accordingly, it is an object of this invention to provide an improved technique for correcting the type of signal distortion described above.

It is another object to provide such a technique which overcomes one or more of the drawbacks of previously known corrective techniques.

It is still another object to provide such a technique which is comparatively simple and inexpensive.

It is still another object to provide such a technique which is capable of application to a distorted signal which is digital in its characteristics, and therefore less subject to noise than if it were analog.

SUMMARY OF THE INVENTION

These and other objects which will appear are achieved in accordance with the present invention by introducing, at a carefully selected stage in the path of the signals derived from the recording medium, a low-pass filtering operation not previously utilized in this path.

This low-pass filtering is performed following a non-linear element provided in the signal path. This non-linear element may be a zero-crossing detector, or a full-wave rectifier.

This low-pass filtering, which is preferably performed by means of a Gaussian filter, is followed by a series of operations, which, in themselves, may be somewhat analogous to those performed in prior processing techniques for such played back signals. However, the fact that these operations are now preceded by the low-pass filtering as described above causes them to have a different ultimate effect. These operations include differentiating the filter output signals, detecting the resulting zero-crossings in one direction, and generating output pulses whose timing corresponds to these detected zero-crossings. These output pulses are then further utilized in conventional manner for information recovery.

It can be shown that this processing of the original signals in accordance with the present invention substantially reduces the pulling experienced by the output pulses, compared with what would occur in the absence of the present invention. Other advantages, in terms of simplicity, reduced noise susceptibility, and so forth, will also be experienced.

DESCRIPTION OF THE PREFERRED EMBODIMENTS

Figure 1:
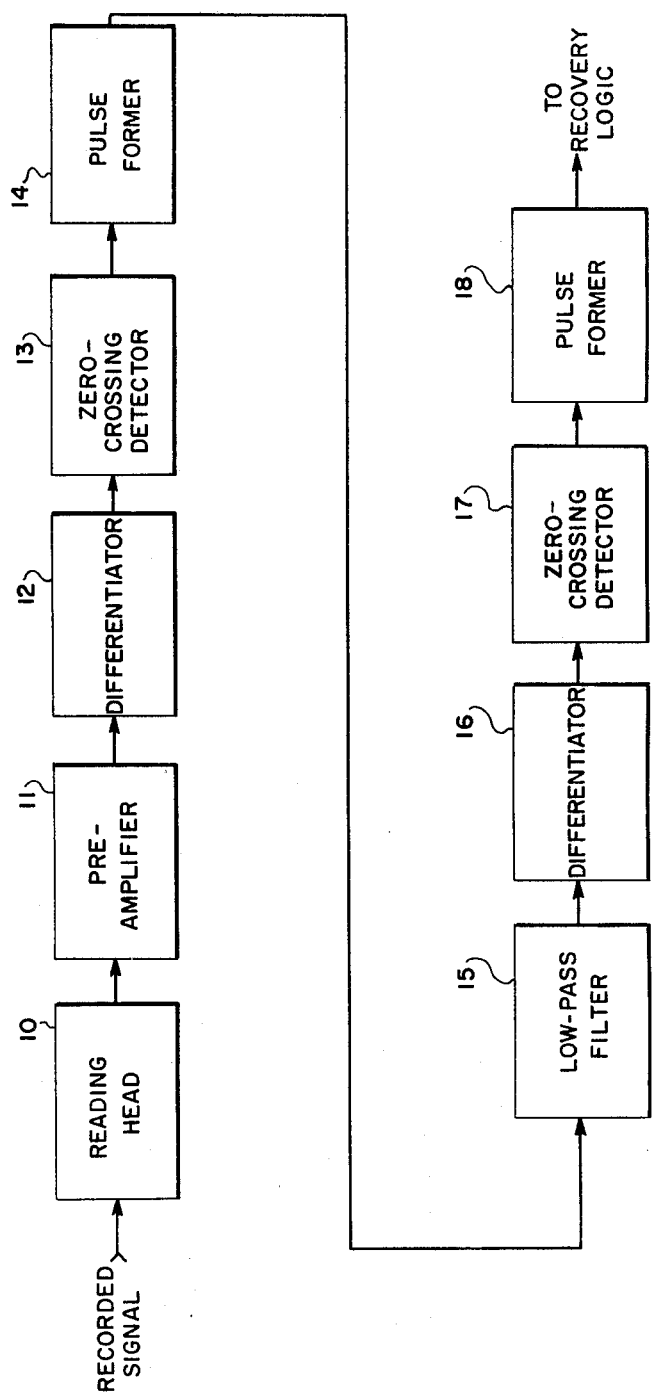
FIG. 1 is a block diagram of a magnetic recording playback system embodying the present invention.

Referring now to FIG. 1, there is shown a block diagram of the preferred embodiment of the present invention. The system illustrated includes several elements which may be entirely conventional constituents of a playback system. These are reading head 10, preamplifier 11, differentiator 12, zero-crossing detector 13, and pulse former 14.

In accordance with the present invention, these elements 10 to 14 are followed by elements not conventionally found in such a system in the particular stage of the signal processing path shown.

These additional elements include a low-pass filter 15, followed by differentiator 16, zero-crossing detector 17 and pulse former 18. The output from pulse former 18 is then supplied to subsequent signal processing means, generally the recovery logic of the system, which may take any conventional form and is therefore not illustrated or further discussed.

As will be appreciated from the further discussion which follows, the individual elements which comprise the blocks of the system illustrated in FIG. 1 may all take wellknown entirely conventional forms. For that reason, individual circuit-diagrams thereof are not provided.

It is believed helpful to an understanding of the operation of the system of FIG. 1 to next consider the variations in magnetic and electrical phenomena which take place at various stages in that system. To this end, reference is made to FIG. 2 of the drawings which consists of a series of graphs designated 2a through 2f, and which show the amplitude variations of these respective phenomena as a function of time. All of these graphs are drawn to a common time axis designated t. Along this time axis there have been indicated a series of consecutive time intervals of equal duration, each designated T. It will be understood that these time intervals T may have any of a variety of design values. However, a typical value would be T=200 ns.

FIG. 2a shows a typical variation of the magnetization recording medium. The upper level in this FIG. 2a represents one direction of magnetization while the lower level represents the opposite direction of magnetization. Thus, in FIG. 2a, a change from one direction to the other takes place at $t_1$; a change back to the original direction takes place at $t_2$, a length of time T later; a change back again takes place at $t_3$, at an interval equal to 2T later; followed by another reversal at $t_4$, another interval T later. It will be understood that the reversals continue to ccur from time to time at intervals which are multiples of T determined by the information magnetically encoded on the recording medium.

In recovering this magnetically encoded information in the form of electrical signals, it is desired to ultimately determine as accurately as possible the timing of the transitions between directions of magnetization, such as those shown occurring at $t_1$ through $t_4$ in FIG. 2a. Unfortunately, as is well known, the heads used to read such magnetically encoded information have a far from instantaneous frequency response and therefore produce output signals which only slightly resemble the rectangular variations shown in FIG. 2a.

A typical electrical signal waveform resulting from reading out the recorded magnetic variations represented in FIG. 2a is illustrated in FIG. 2b. It will be noted that this output signal bears scarcely any resemblance in terms of a waveform to the input signal represented in FIG. 2a.

FIGS. 2c and 2d show why this is so. These two figures show component waveforms from which it can be said that the actual waveform of FIG. 2b is constituted.

As can be seen the waveform of FIG. 2c is essentially a series of Gaussian pulses peaking at the positive, upward going transitions 22, 23 of FIG. 2a while the waveform of FIG. 2d is a series of Gaussian pulses peaking at the downwardly going transitions 24, 25 of FIG. 2a. In both waveforms, the pulses are said to be Gaussian. It is to be understood that these pulses are only approximations of a true Gaussian pulse, as is typically the response of a recording system to a pulse input such as is illustrated in FIG. 2a.

FIG. 2b is the composite electrical signal which is actually present at the output of the data reading device, with its configuration determined by what can be considered as the composite of its two individual components, shown in FIGS. 2c and 2d. As a composite of two Gaussian waveforms, the resulting signal of FIG. 2b is also a Gaussian waveform.

It turns out that the points in the signal waveform of FIG. 2b which most reliably correspond to the upwardly 22, 23 and downwardly 24, 25 going transitions in FIG. 2a are the positive peaks 26 and the negative peaks 27 of waveform 2b respectively.

In order to actively establish the timing of these peaks, it is conventional to differentiate the signal of FIG. 2b, thereby obtaining the signal of FIG. 2e, which therefore corresponds to the output signal of differentiator 12 in FIG. 1.

As is apparent, it is the crossing of a threshold level, commonly referred to as the zero-crossings, shown at 28 in FIG. 2e, which correspond to the peaks 26, 27 of the waveform of FIG. 2b and therefore also to the timing of the transitions 22, 23, 24, 25 of FIG. 2a. However, it will be immediately observed that the zero-crossings 28 in FIG. 2e are not precisely in time coincidence with the transitions 22, 23, 24, 25 of FIG. 2a but are significantly displaced from their desired location in the time domain.

As a result, pulses such as shown in FIG. 2f, which are conventionally formed from these zero-crossings and which therefore represent the output signals from pulse former 14 in FIG. 1, also do not occur at the desired points in time but are displaced therefrom, as is visible in FIG. 2f.

Figure 2:
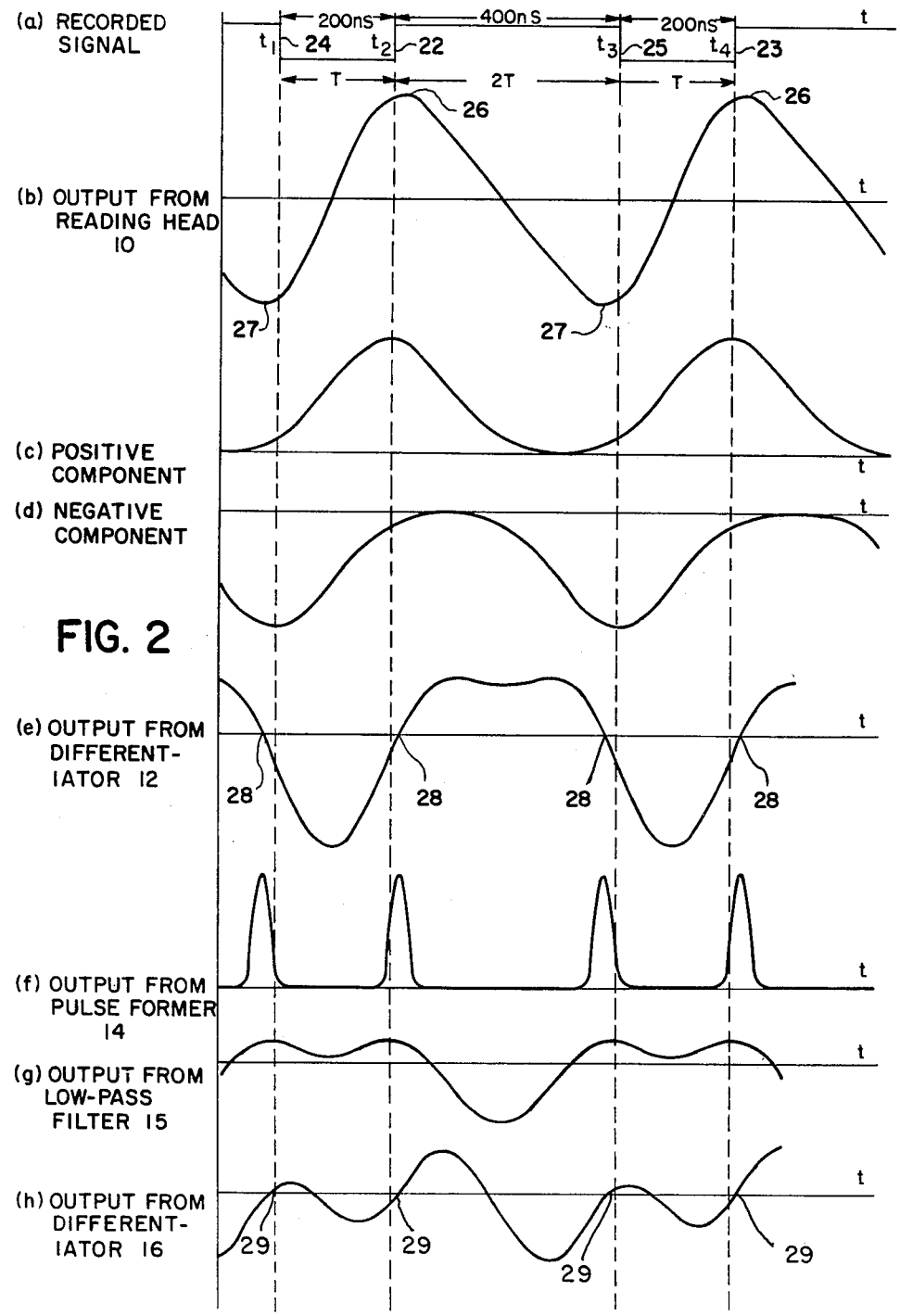
FIG. 2 shows illustrative signal waveforms which may prevail in the system of FIG. 1.

This displacement, for the example illustrated in FIG. 2, is typically on the order of 20 ns, i.e. about one-tenth of the time interval T. This is a degree of displacement which can lead to serious distortions and errors in the ultimate reproduction and utilization of the so recorded information.

In accordance with the present invention, rather than being introduced directly into the recovery logic of the information processing system, the output signal from pulse former 14 in FIG. 1, as represented in FIG. 2f of the drawings, is introduced into a low-pass filter 15.

Low-pass filter 15 is preferably a Gaussian filter, so that the response produced through that filter will be Gaussian, as was the original played back signal. However, other types of low-pass filters may be used if desired for a given application. The circuit used to form low-pass filter 15 may be any one of many known filter designs. Typical examples of such designs may be found, for example, in Zverev, "Handbook of Filter Synthesis", or other similar texts.

A typical waveform which will result when the signal of FIG. 2f is introduced into low-pass filter 15 is shown in FIG. 2g. This result is illustrative of that which would be obtained using a 1.4 megahertz Gaussian filter. This result will vary slightly as the parameters of filter 15 are varied.

This output signal is then further supplied to an additional differentiator 16 whose output signal is illustrated in FIG. 2h. The signal of FIG. 2h again has crossings of a threshold level. However, as will be observed, these threshold crossings differ in two important respect from those which are observed in the output signal from differentiator 12 illustrated in FIG. 2e. Specifically, there are now threshold crossings is now a threshold crossing 29 of the same polarity in the vicinity of each of the points in time corresponding to transitions 22, 23, 24, 25 of FIG. 2a. Moreover, these positive going threshold crossings 29 in FIG. 2h, while still not perfectly aligned with the transitions of FIG. 2a, are nevertheless substantially closer to these transitions than were the threshold crossings 28 in FIG. 2e.

In accordance with the present invention, it is these positive going threshold crossings 29 of FIG. 2h which are detected in zero-crossing detector 17 and which are used to form new output pulses in pulse former 18. Incidentally, this means that the zero-crossing detector 17 is of a somewhat different construction than zero-crossing detector 13. The latter detects all zero crossings, regardless of polarity; the former only those of a given polarity, positive-going in the example illustrated in FIGS. 1 and 2. The construction of zero-crossing detectors having such capabilities is known.

It will be apparent that the output pulses produced by pulse former 18 in accordance with the present invention are more closely aligned with the times of occurrence of the transitions 22, 23, 24, 25 of FIG. 2a than were the output pulses from pulse former 14. It is this greater closeness of alignment which constitutes the essence of the present invention.

The processing of the signals from pulse former 18 may then be entirely conventional, and correspond essentially to that which would have been given to the output signals from pulse former 14 in the absence of the present invention.

However, because of the closer alignment of these output pulses from pulse former 18 with the transitions of FIG. 2a, the resulting signal recovery and utilization will be much more precise and error free.

Under the specific circumstances illustrated in the drawings, the displacement of these output pulses from pulse former 18 will only be about half as great as the displacement of the output pulses from pulse former 14. Thus the present invention, in the situation illustrated, produces a two-to-one reduction in distortion. It can also be shown that other degrees of distortion reduction, greater than or less than two-to-one, are achievable by appropriate selection of the parameters of the low-pass filter 15.

Other embodiments of the invention are also possible. For example, in FIG. 3 there is shown an embodiment of the present invention in which the operations performed on the played back signal which characterize the present invention take place at a different location in the system than in FIG. 1, which has both advantages and disadvantages as compared with the embodiment of FIG. 1.

Figure 3:
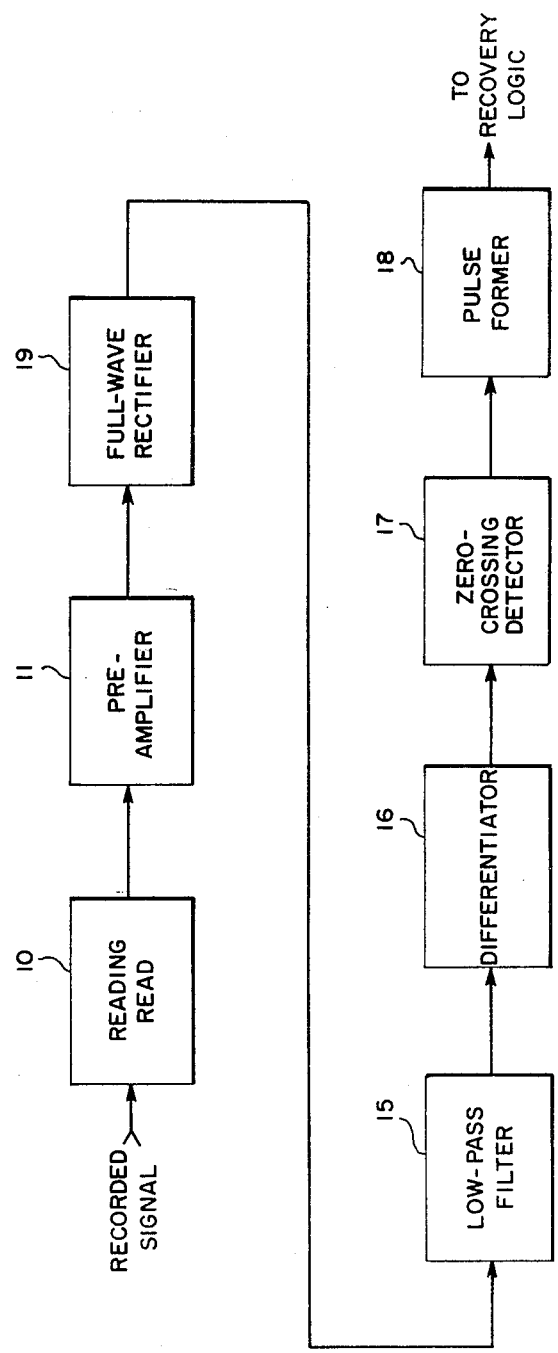
FIG. 3 is a block diagram of another embodiment of the invention.

Specifically, in FIG. 3 there are omitted the differentiator 12, the zero-crossing detector 13 and the pulse former 14. In their place there is provided a full-wave rectifier circuit 19. The remainder of the system of FIG. 3 may be the same as in FIG. 1. Thus, in effect the invention in FIG. 3 operates directly upon the analog signal which is derived from the reading head 10 via preamplifier 11.

It can be shown that the newly provided full-wave rectifier 19 performs an operation upon this analog signal which is sufficiently similar to that of the absent elements 12, 13 and 14 so that the remainder of the system, i.e. elements 15 through 18, can still function in accordance with the fundamental principles of this invention.

Briefly, the full-wave rectifier 19 produces from the signal derived by reading head 10 (FIG. 2b) a signal in which the alternate positive and negative peaks have been converted into peaks of the same polarity (e.g. all positive). Thus the signal produced by full-wave rectifier 19 can be considered (for the purpose of this invention) as the rough analog equivalent of the pulse waveform of FIG. 2f. From this, the remainder of the system operates as explained with relation to FIGS. 1 and 2.

An advantage of the system shown in FIG. 3 is that it omits certain elements of the system of FIG. 1. A disadvantage is that it is potentially more susceptible to noise.

Other embodiments of systems in accordance with the present invention are possible provided that the signal is, at some point in the system, introduced into a low-pass filter after being subjected to at least one non-linear circuit element.

As previously discussed, the data signal is read as a Gaussian waveform representative of that original data signal. This Gaussian signal has alternating positive and negative pulses which are "pulled" in time due to their close proximity to each other.

To reduce this "pulling" effect, the signal is first subjected to a non-linear element, to rectify the positive and negative pulses of the signal. This rectified signal is then introduced into a low-pass filter which pushes the "pulled" pulses back toward their true positions.

Consequently, the improvement provided by the system of the present invention will be provided by any one of many system configurations having a low-pass filter which follows a non-linear element (e.g. a pulse forming circuit, a full-wave rectifier, etc.).

Figure 4:
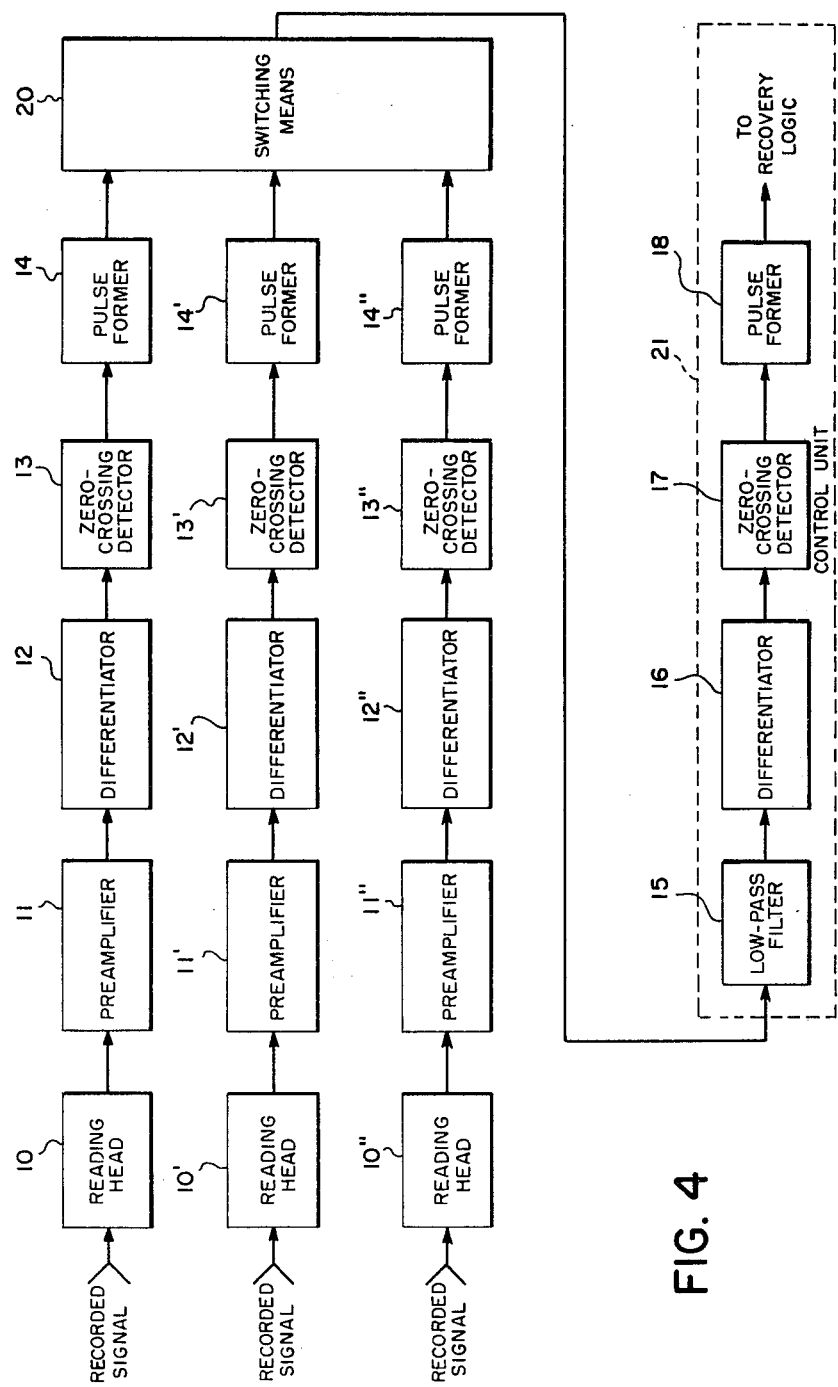
FIG. 4 is a block diagram which shows how still further advantages can be derived from application of the present invention to a system such as shown in FIG. 1.

Finally, FIG. 4 shows how the present invention may be applied so as to realize substantial equipment economics in large-scale systems. In such systems, a single so-called "control unit" processes the played back signals from a multiplicity of reading heads, being connected sequentially to different ones of these heads as required. Such systems are often referred to as time division multiplexing systems. In an embodiment of the invention such as shown in FIG. 1, the new elements are susceptible of being made part of the one control unit, rather than requiring separate elements for each reading head. This is diagrammatically represented in FIG. 4, where a switching means 20 is fed with the output signals from a plurality of reading heads 10, 10', 10" via their respective associated elements 11 to 14. The switching means 20 then selectively connects one or another of these signals to control unit 21, which includes the elements 15 to 18. Switching means 20 may comprise a plurality of "OR" gates which provide this function, or other switching means could similarly be used.

This potentially provides a very substantial saving as compared with previously proposed compensatory arrangements which did not lend themselves to being made part of the control unit, but had to be replicated for each individual reading head. Although three groups of elements 10 to 14 are illustrated, this capability would also be applicable to systems having only two groups of elements 10 to 14, or more than three groups of such elements.

The foregoing discusses a system which is capable of reducing interference and distortion in a played back signal, specifically intersymbol interference between consecutive positive and negative pulses of that signal.

Although the foregoing has been discussed in contrast with linear signal compensating systems, it is to be understood that the system of the present invention is suitable for use in conjunction with such systems, either predistortion systems, or playback equalization systems. In fact, the combined use of such systems is preferred to obtain an optimized signal for introduction into the recovery logic, since no one system is capable of providing perfect compensation.

Moreover, although the foregoing has been discussed in conjunction with a magnetic recording system, it is to be understood that the foregoing is equally applicable to other data processing or transmitting systems which exhibit similar types of signal interference and distortions. It is also applicable to a variety of pulse codes exhibiting similar "pulling" effects.

I claim:

1. In a system for processing a first signal which has consecutive opposite-polarity peaks corresponding to information represented by transitions in a data bearing medium, and in which the said signal peaks are subject to misalignment with respect to the corresponding data transitions, the improvement which comprises:
    means for producing a second signal from said first signal, which second signal has peaks with substantially the same said misalignment but of the same polarity;
    means for subjecting the produced second signal to low-pass filtering; and
    means for deriving from said low-pass filtering means a third signal having peaks substantially in alignment with respective peaks of the same polarity in said second signal;
    whereby the misalignment between the peaks of the third signal and the data transitions is substantially less than the misalignment between the peaks of the first signal and the data transitions, reducing the misalignment between the data and the processed signal which is representative of said data.

2. The system of claim 1 wherein the second signal producing means is a non-linear element.

3. The system of claim 1 wherein the non-linear element is a rectifier.

4. The system of claim 3 wherein the non-linear element comprises means for forming pulses in response to said first signal.

5. The system of claim 3 wherein the non-linear element is a full-wave rectifier.

6. The system of claim 1 wherein the low-pass filtering means is a Gaussian filter.

7. The system of claim 6 wherein the parameters of the filtering means are selected in accordance with the transition rate of the data bearing medium.

8. The system of claim 1 wherein the third signal deriving means comprises:
    means for differentiating said signal produced by lowpass filtering;
    means for detecting when said filtered differentiated signal crosses a selected threshold; and
    means for forming pulses in response to said threshold detecting means.

9. The system of claim 8 wherein the selected threshold is the zero-crossing.

10. The system of claim 9 wherein said threshold detecting means detects only those zero-crossings having slopes of the same polarity.

11. The system of claim 10 wherein only the positive-going zero-crossings are detected.

12. The system of claim 1 wherein the data bearing medium is a magnetic recording means.

13. The system of claim 1 wherein each of a plurality of first signals are produced from each of a plurality of data bearing media, and means for selectively, and alternately, connecting one of the plurality of first signals to said second signal producing means for a selected duration.

14. The system of claim 13 wherein said system has less of said second signal producing means than of said data bearing media.

15. The system of claim 14 having only one second signal producing means.

16. The system of claim 1 further comprising means for predistorting the data from which said first signal is derived, to compensate for misalignment of the data transitions with said first signal.

17. The system of claim 1 further comprising means for equalizing said third signal, to compensate for misalignment of the data transitions with said first signal.

18. In a method for processing a first signal which has consecutive opposite-polarity peaks corresponding to information represented by transitions in a data bearing medium, and in which the said signal peaks are subject to misalignment with respect to the corresponding data transitions, the improvement which comprises:
  producing a second signal from said first signal, which second signal has peaks with substantially the same said misalignment but of the same polarity;
  subjecting the produced second signal to low-pass filtering; and
  deriving from said filtered second signal a third signal having peaks substantially in alignment with respective peaks of the same polarity in said second signal;
  whereby the misalignment between the peaks of the third signal and the data transitions is substantially less than the misalignment between the peaks of the first signal and the data transitions, reducing the misalignment between the data and the processed signal which is representative of said data.

* * * * *